H. M. WOOLLEY, Jr., AND D. J. McKEAN.
SELF STEERING VEHICLE.
APPLICATION FILED SEPT. 7, 1920.
1,387,091.
Patented Aug. 9, 1921.
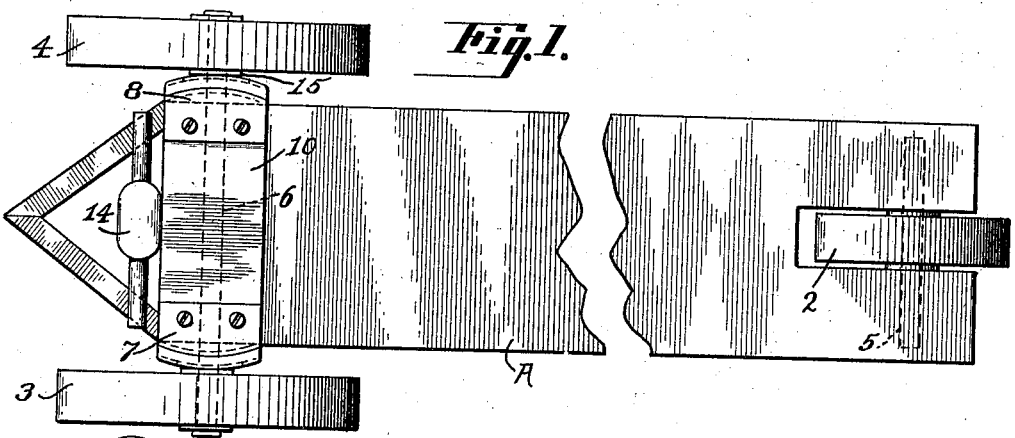
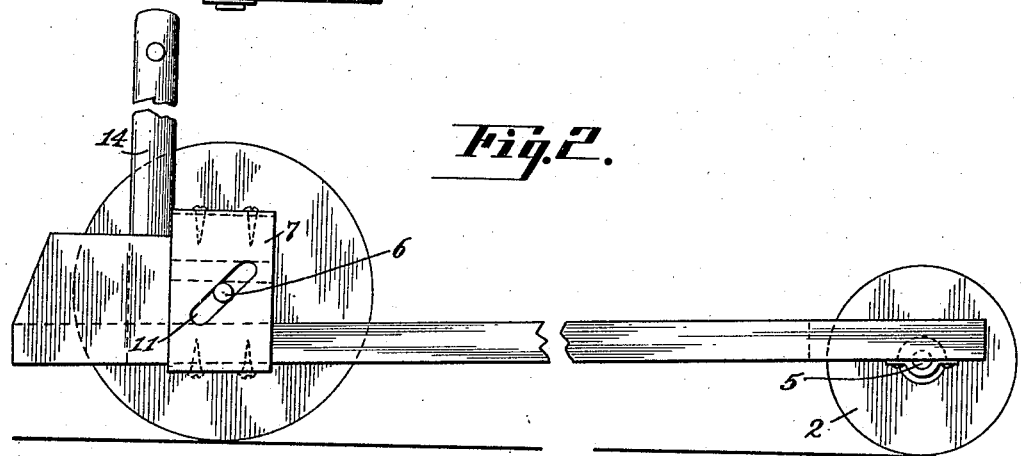
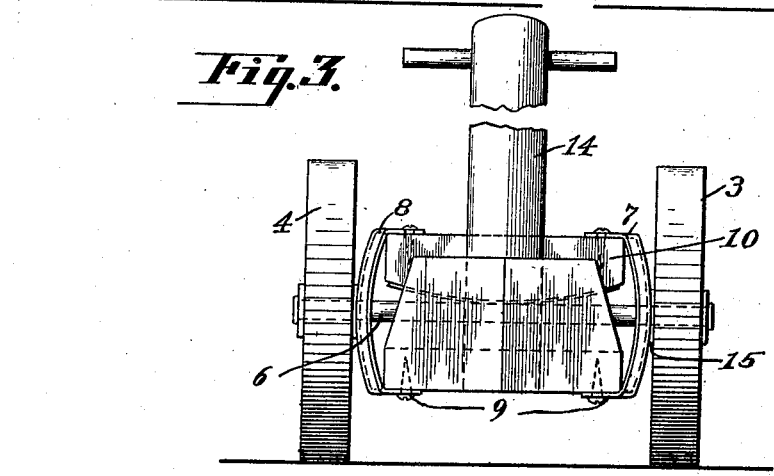
INVENTORS
Horace M. Woolley, Jr.
Donald J. McKean.
BY Chas. E. Townsend
ATTORNEY.

UNITED STATES PATENT OFFICE.

HORACE M. WOOLLEY, JR., AND DONALD J. McKEAN, OF ALAMEDA, CALIFORNIA; SAID McKEAN ASSIGNOR TO SAID WOOLLEY.

SELF-STEERING VEHICLE.

1,387,091.  Specification of Letters Patent.  Patented Aug. 9, 1921.

Application filed September 7, 1920. Serial No. 408,651.

*To all whom it may concern:*

Be it known that we, HORACE M. WOOLLEY, Jr., and DONALD J. McKEAN, citizens of the United States, residing at Alameda, in the county of Alameda and State of California, have invented a new and useful Improvement in Self-Steering Vehicles, of which the following is a specification.

This invention relates to a self steering vehicle and especially to an automatic steering arrangement therefor.

One of the objects of the present invention is to provide a simple, substantial, easily operated and cheaply manufactured toy coaster or like vehicle which is adapted to afford an attractive source of amusement and exercise for children, and especially to provide an automatic steering mechanism whereby the course of the coaster or vehicle may be directed.

Another object of the invention is to provide a steering mechanism which may be placed either on the front or rear end of the vehicle and which is actuated by tilting of the body of the vehicle; further to provide means carried by the vehicle whereby tilting movement thereof may be transmitted to turn the steering axle to one side or another, and also adapted to straighten the axle when normal position is assumed.

Another object of the invention is to provide means for securing the steering axle against lateral movement both in normal and in turned position.

Further objects will hereinafter appear.

The invention consists of the parts and the construction, combination and arrangement of parts as hereinafter more fully described and claimed, having reference to the accompanying drawings, in which—

Figure 1 is a plan view of a coaster showing the application of the invention.

Fig. 2 is a side elevation of the same.

Fig. 3 is a front view.

Referring to the drawings in detail, which in the present instance illustrate a child's coaster or speedster, A indicates the body of the vehicle, 2 a rear supporting wheel, and 3 and 4 a pair of front supporting and steering wheels. The rear wheel is secured to an axle 5 or may be journaled thereon, while the front wheels are supported upon an axle 6 and are freely turnable thereon.

The method of supporting the axle 6 and of turning the same with relation to a longitudinal axis drawn through the vehicle forms the subject matter of the present invention.

Suitably secured on each side of the vehicle and adjacent the forward end thereof is a pair of bracket members 7 and 8. The brackets shown in the present instance are formed of sheet metal or the like and the exterior face of each bracket forms a section of the surface of a sphere as will hereinafter be described. The brackets serve two main functions, first, that of supporting the front end of the vehicle, and secondly that of transmitting a turning movement to the front axle. The vehicle body A is of the under-slung type inasmuch as the front end thereof is secured to the lower ends of the brackets 7 and 8 as indicated at 9; the brackets being in turn supported with relation to the axle by means of a transverse rocker bar 10 secured between the upper ends of the respective brackets. This rocker bar rests directly upon the front axle 6 and thereby forms a rocking or tilting support about which the vehicle body may be tilted.

By referring to Figs. 1, 2 and 3, and particularly Fig. 2, it will be seen that the respective bracket plates 7 and 8 are slotted as at 11; further that the slots are disposed on an incline and that both slots are inclined in the same direction. The axle proper extends beneath the rocker bar 10 and then through the slots 11; the wheels 3 and 4 being journaled on the respective ends of the axle at points exterior of the bracket plates.

In actual operation steering of the vehicle is accomplished in the following manner: The rider when standing with one or both feet upon the platform or body portion A, remains in a vertical position when traveling straight ahead. When he wishes to turn to the right or to the left he leans in that direction and thereby causes the axle, together with the front wheels 3 and 4, to turn in that direction, the rider at the same time naturally banking the curve or turn. The tilting of the vehicle body in one direction or another may be accomplished by the aid of a vertically disposed stick 14 secured to the front end of the vehicle. This is grasped by the rider under ordinary circumstances and also serves the function of steadying the rider.

To more thoroughly describe the steering mechanism proper, it may be assumed that the vehicle body is tilted to the right. Such movement will cause the inclined slot formed in the plate 8 to move downwardly on the axle and will to this extent force the axle and the wheel 4 in a rearward direction. The slot in the bracket plate 7 will at the same time move upwardly with relation to the axle and will due to its incline force the axle in a forward direction. The axle and front wheels will thus be turned to such a position that the vehicle will turn to the right; the degree of the turn depending entirely upon the extent to which the vehicle body is tilted. A sharp or slow turn may thus be made. If it is desired to turn to the left, it is obvious that the axle will first assume a normal position as the vehicle body is tilted to horizontal and that it will gradually turn to the left below the rocker bar 10 as the vehicle body is tilted to the left; further that the angle assumed by the axle will entirely depend upon the tilting movement imparted to the body either by the shifting of weight caused by the rider or by tilting through the medium of the stick.

The bar 10 is free to rock on the axle within the limits allowed by the inclined slots 11 and the axle is similarly free to turn with relation to the longitudinal axis of the body due to the inclined position of the slots, said turning movement being of course limited by the length of the slots.

It has previously been stated in the specification that each bracket is formed from a section of the surface of a sphere. This formation is of considerable importance as the vehicle body tilts with relation to the axle when a turn is made and the axle simultaneously turns with relation to the brackets or the longitudinal axis of the vehicle when the turn is made. The center of the sphere from which the brackets are formed should therefore be equal to a circle drawn from the center of the axle, said circle forming both the vertical and horizontal curvature of each bracket plate. The importance of thus shaping the brackets can readily be seen when it is stated that it positively secures the axle against lateral movement with relation to the vehicle body or the brackets supporting the same. If the body and the rocker 10 are tilted, it is obvious that the inner collars formed on the axle and indicated at 15 will follow the vertical curve of the respective brackets, similarly that as the axle turns with relation to the longitudinal axis of the vehicle the horizontal curvature of the respective brackets is followed. The axle is thus secured against lateral movement at all times, a feature which is certainly desirable as it materially relieves unnecessary wear, and similarly insures good service and long life of the article to the consumer.

While the brackets 7 and 8 and the rocker bar 10 are shown as constructed from separate pieces, it is obvious that an integral casting may be made; further that the materials and finish of these and other parts of the structure may be such as the experience and judgment of the manufacturer may dictate or varying conditions may demand.

Having thus described our invention, what we claim and desire to secure by Letters Patent is—

1. In combination with the body of a vehicle, a rocking member supporting one end of the body, an axle upon which the rocking member is supported, wheels on said axle, and means associated with the rocking member and axle whereby a turning movement of the axle with relation to the longitudinal axis of the vehicle will be had when a tilting movement is imparted to the body and the rocking member, said turning movement of the axle corresponding with the direction of tilting.

2. The combination with the body of a vehicle of a rocking member supporting one end of the body, an axle upon which the rocking member is supported, wheels on said axle, a bracket member on each end of the rocker, an inclined slot formed in each bracket member through which the axle extends, the exterior surface of the bracket members forming sections of a circle, said circle being struck from the center about which the axle swings.

3. In a vehicle of the character described an axle, a vehicle body, a rocking member supporting the body with relation to the axle, a pair of bracket plates connecting the rocking member and body, and means on each plate for transmitting a turning movement to the axle on a horizontal plane when the rocker and body are tilted.

4. In a vehicle of the character described an axle, a vehicle body, a rocking member supporting the body with relation to the axle, a pair of bracket plates connecting the rocking member and body, and an inclined slot formed in each plate through which the axle extends, said plates having an exterior hemispherical surface with the center of the axle as a center.

5. In a vehicle of the character described an axle, an elongated rocking member supported on the axle and having its longitudinal axis disposed parallel with the axle, a curved rocking face formed on the lower side of the rocking member to form a rocking surface between the rocking member and the axle, a vehicle body disposed below the axle, and hangers connecting the body with the opposite ends of the rocking member.

6. In a vehicle of the character described an axle, an elongated rocking member supported on the axle and having its longitudinal axis disposed parallel with the axle, a curved rocking face formed on the lower side of the rocking member to form a rocking surface between the rocking member and the axle, a vehicle body disposed below the axle, hangers connecting the body with the opposite ends of the rocking member, and means on said hangers for transmitting a turning movement to the axle on a horizontal plane when the rocker is tilted.

7. In a device of the character described a rocking member, an axle upon which the rocking member is supported, a bracket member on each end of the rocking member, an inclined slot formed on each bracket member through which the axle extends, and a spherical surface formed on the exterior face of each bracket member, said spherical surface having its center disposed at the approximate center of the axle.

In testimony whereof we have hereunto set our hands in the presence of two subscribing witnesses.

HORACE M. WOOLLEY, Jr.
DONALD J. McKEAN.

Witnesses:
  Miss M. McCraith,
  Thos. D. McCraith.